(12) United States Patent
Sasaki

(10) Patent No.: US 8,259,341 B2
(45) Date of Patent: Sep. 4, 2012

(54) INFORMATION PROCESSING APPARATUS, CONTROL METHOD, STORAGE MEDIUM

(75) Inventor: Hidemi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 12/552,416

(22) Filed: Sep. 2, 2009

(65) Prior Publication Data

US 2010/0053681 A1   Mar. 4, 2010

(30) Foreign Application Priority Data

Sep. 4, 2008   (JP) ................................. 2008-226625

(51) Int. Cl.
*G06K 15/00*   (2006.01)

(52) U.S. Cl. ...................... 358/1.17; 358/1.13; 358/1.14; 358/1.15; 358/1.16; 358/1.18; 711/165; 711/170; 711/171

(58) Field of Classification Search ........ 358/1.13–1.18; 711/170, 165, 171
See application file for complete search history.

(56) References Cited

U.S. PATENT DOCUMENTS

| | | | | |
|---|---|---|---|---|
| 6,049,390 A | * | 4/2000 | Notredame et al. | 358/1.15 |
| 6,304,336 B1 | * | 10/2001 | Sugaya | 358/1.16 |
| 6,476,931 B1 | * | 11/2002 | Aizikowitz et al. | 358/1.18 |
| 6,985,249 B2 | * | 1/2006 | Klassen et al. | 358/1.18 |
| 7,019,864 B2 | * | 3/2006 | Delhoune et al. | 358/1.18 |
| 7,684,076 B2 | * | 3/2010 | Shapovalov | 358/1.17 |
| 2004/0091162 A1 | * | 5/2004 | Donahue et al. | 382/245 |

FOREIGN PATENT DOCUMENTS

| | | |
|---|---|---|
| JP | 2002-342039 A | 11/2002 |
| JP | 2007-226465 A | 9/2007 |

* cited by examiner

*Primary Examiner* — King Poon
*Assistant Examiner* — Dennis Dicker
(74) *Attorney, Agent, or Firm* — Canon U.S.A., Inc. IP Division

(57) ABSTRACT

A host computer executes an application to create variable print data. Then, the host computer executes an application to optimize the created variable print data. Then, the host computer executes a device driver to send the optimized variable print data to an image forming apparatus.

3 Claims, 12 Drawing Sheets

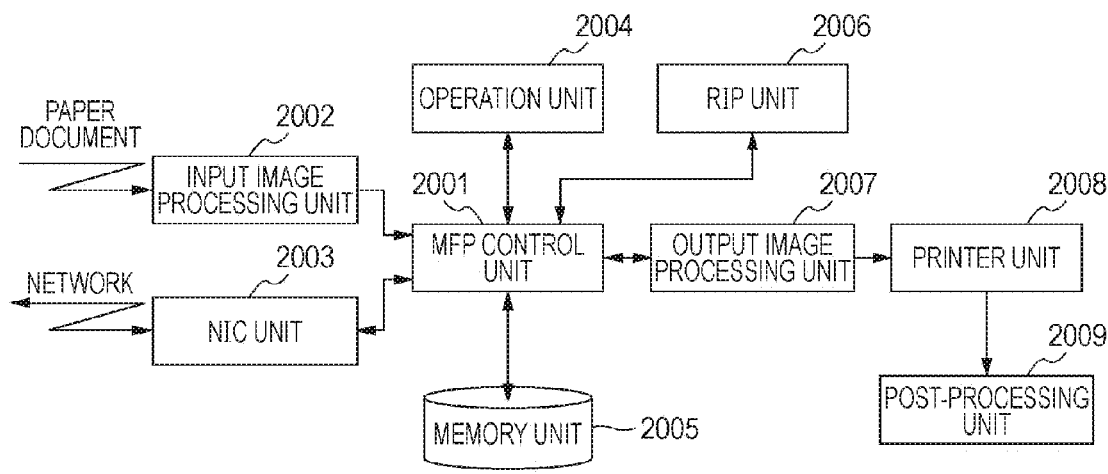
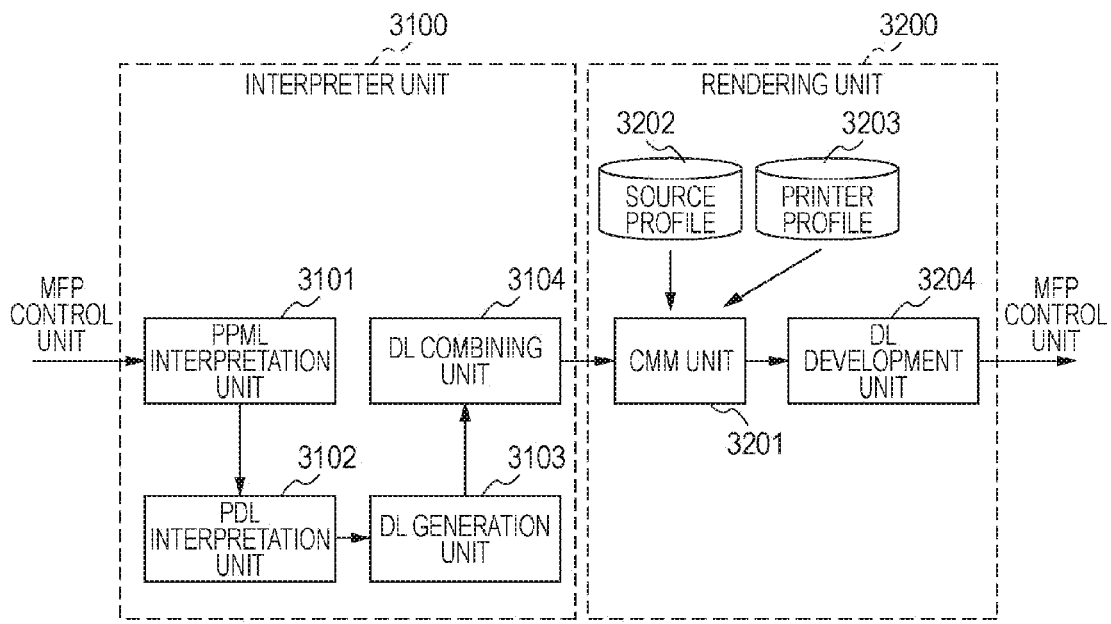

FIG. 9A

|  | 1 | 2 | 3 | 4 | 5 | 6 | 7 | 8 | NUMBER OF Ns | SIZE (MB) | N × SIZE |
|---|---|---|---|---|---|---|---|---|---|---|---|
| Sea | S | N | C | N | N | C | C | E | 3 | 5.0 | 15.0 |
| Flower |  | S | N | C | E |  |  |  | 1 | 6.5 | 6.5 |
| Cat1 |  |  |  | E |  |  |  |  | 0 | 1.0 | 0.0 |
| Cat2 | S | N | N | N | C | N | E |  | 4 | 1.2 | 4.8 |
| Cat3 |  | S | C | N | N | C | N | E | 3 | 1.4 | 4.2 |
| CatA |  |  | S | C | N | N | E |  | 2 | 0.7 | 1.4 |
| CatB |  | S | N | N | C | N | N | E | 4 | 0.8 | 3.2 |
| CatC | S | N | N | N | E |  |  |  | 4 | 0.6 | 2.4 |
|  |  |  |  |  |  |  |  |  |  | Σ= | 37.5 |

FIG. 9B

|  | 4 | 5 | 2 | 8 | 3 | 6 | 7 | 1 | NUMBER OF Ns | SIZE (MB) | N × SIZE |
|---|---|---|---|---|---|---|---|---|---|---|---|
| Sea |  |  |  | S | C | C | C | E | 0 | 5.0 | 0.0 |
| Flower | S | C | E |  |  |  |  |  | 0 | 6.5 | 0.0 |
| Cat1 | E |  |  |  |  |  |  |  | 0 | 1.0 | 0.0 |
| Cat2 |  | S | N | N | N | N | C | E | 4 | 1.2 | 4.8 |
| Cat3 |  |  | S | C | C | E |  |  | 0 | 1.4 | 0.0 |
| CatA | S | N | N | N | C | N | E |  | 4 | 0.7 | 2.8 |
| CatB |  | S | C | E |  |  |  |  | 0 | 0.8 | 0.0 |
| CatC |  |  |  |  |  | S | N | E | 1 | 0.6 | 0.6 |
|  |  |  |  |  |  |  |  |  |  | Σ= | 8.2 |

INFORMATION PROCESSING APPARATUS, CONTROL METHOD, STORAGE MEDIUM

BACKGROUND OF THE INVENTION

1. Field of the Invention

The present invention relates to an information processing apparatus for creating variable print data to be output to an image forming apparatus.

2. Description of the Related Art

Japanese Patent Laid-Open No. 2002-342039 discloses an image forming system in which frequently used data (master data) is registered in an image forming apparatus and in which data that can vary (variable data) is sent to the image forming apparatus later. The image forming system also has a function for merging the master data and the variable data and printing merged data.

The printing function is a function for printing a combination of an image corresponding to a background called master data and data called variable data (such as ornamental letter data and photographic image data). A combination of the master data and the variable data is referred to as an "image resource".

Actually, a plurality of image resources contained in records in a database are arranged to form different images depending on the content of the individual records.

In this case, desirably, the image resources are cached on a memory incorporated in the image forming system and can be processed at a high speed. In reality, however, the memory size available for caching has a limitation in terms of hardware or cost.

Accordingly, if the image resources cannot be held in a memory cache, the image resources are generally held in a secondary storage medium such as a hard disk.

However, this involves processes for writing created data into the secondary storage medium and reading the data into the memory from the secondary storage medium. Thus, a considerable processing time is required.

Japanese Patent Laid-Open No. 2007-226465 discloses a cache efficient use technique in which data is divided into records so that the records are arranged in descending order starting from the record having the highest degree of overlap with respect to a reference record and in which printing is performed using a plurality of devices. Thus, a specific device successively processes records containing the same image resource to achieve high efficiency. To this end, it is assumed that the printing order may or may not be important in variable printing depending on the case. For example, when concert tickets are numbered, the printing order is important.

Direct mail printing, on the other hand, would not be much affected by changing the printing order even though the mailing order is changed. The technique disclosed in Japanese Patent Laid-Open No. 2007-226465 is effective for the latter case.

In the techniques of the related art described above, however, the selection of a reference record and the number of divisions greatly affect the process efficiency.

Therefore, optimization of variable print data in the related art based on the similarity to a reference record may not always produce a beneficial result.

SUMMARY OF THE INVENTION

The present invention provides a mechanism capable of creating variable print data in which an image forming apparatus can efficiently process variable data in a variable printing process.

An aspect of the present invention relates to an information processing apparatus for processing variable print data including a plurality of records and layout data, each record indicating that a plurality of pieces of image data are used. The information processing apparatus includes a specifying unit configured to specify the number of records in which a piece of image data selected from among the plurality of pieces of image data is not used, the records being located between a record in which the piece of image data is used first and a record in which the piece of image data is used last; a deriving unit configured to derive an invalid cache size in accordance with the number of records specified by the specifying unit and a data amount of the piece of image data, the invalid cache size being a size for storing a piece of image data that is not used in a record located between a record in which the piece of image data is used first and a record in which the piece of image data is used last; and a determining unit configured to determine a process order for a record having a minimum invalid cache size with respect to a plurality of combinations of process order for the plurality of records.

Further features of the present invention will become apparent from the following description of exemplary embodiments with reference to the attached drawings.

BRIEF DESCRIPTION OF THE DRAWINGS

FIG. 2B is a block diagram illustrating the configuration of an image forming apparatus.

FIG. 3 is a block diagram illustrating the configuration of a RIP unit shown in FIG. 2B.

FIG. 9A is a diagram showing an example of a result of calculating the invalid cache size.

FIG. 9B is a diagram showing an example of a result of calculating the invalid cache size.

DESCRIPTION OF THE EMBODIMENTS

Embodiments of the present invention will now be described with reference to the drawings.

First Embodiment

System Configuration

Figure 1:
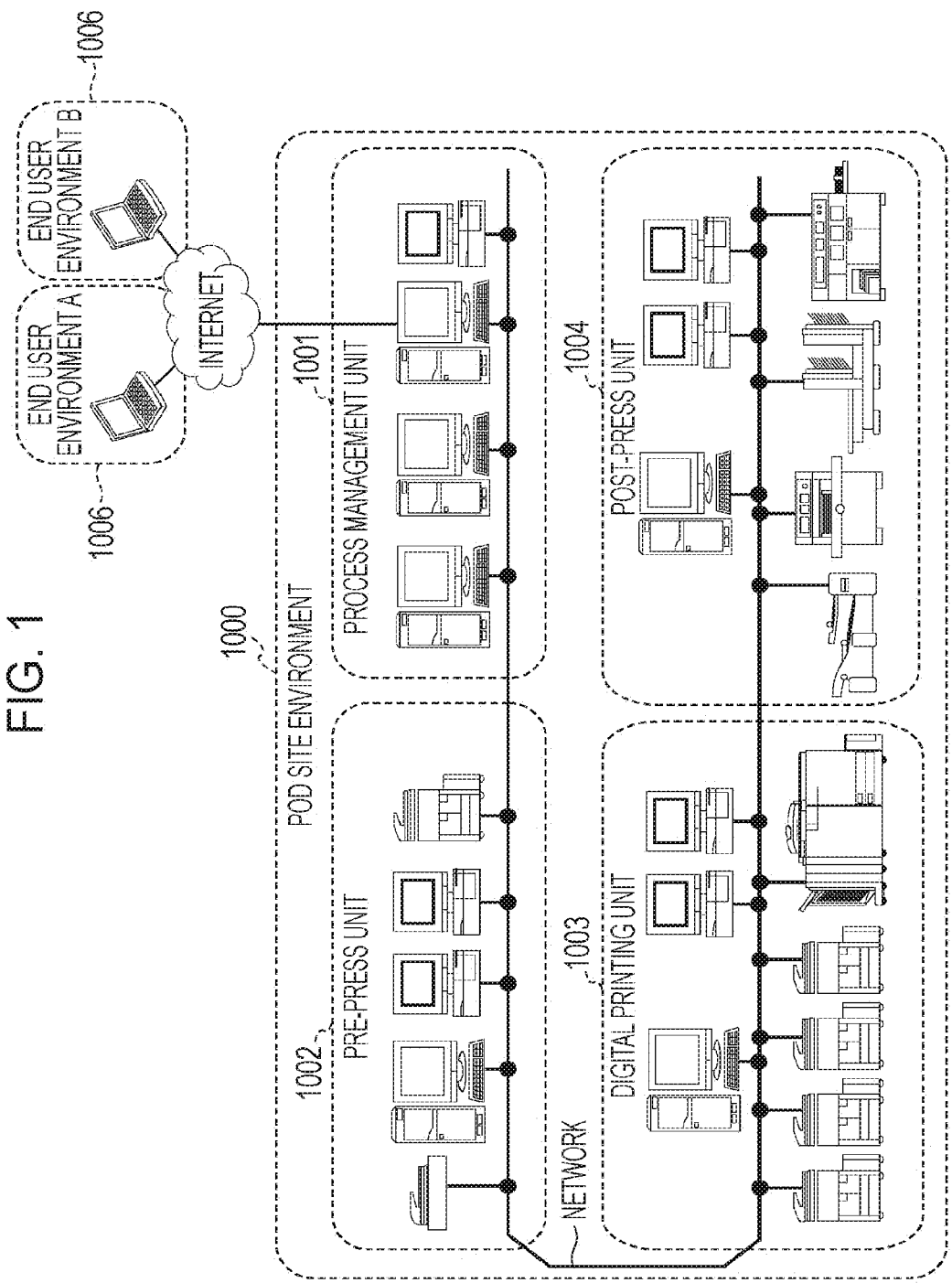
FIG. 1 is a diagram showing an example of a printing system according to an embodiment of the present invention.

FIG. 1 is a diagram showing an exemplary printing system according to an embodiment of the present invention including an information processing apparatus and an image forming apparatus. The printing system is composed of one or a plurality of end-user environments and a print on demand (POD) site environment connected thereto via the Internet. The present embodiment provides an exemplary printing system in which an optimization process, which will be described below, is executed on variable print data created in the information processing apparatus to allow a PPML interpreter of the transmission destination, namely, the image forming apparatus, to interpret PPML data. PPML stands for Personalized Print Markup Language. PPML data has a data structure corresponding to that of variable print data, which will be described in detail below.

Referring to FIG. 1, in end-user environments 1006, an orderer who places a printing order exists. The orderer can request a print job or check a job status using a client personal computer (PC) in an individual end-user environment (end-user environment A or B).

A POD site environment 1000 includes a process management unit 1001, a pre-press unit 1002, a digital printing unit 1003, and a post-press unit 1004.

The process management unit 1001 instructs the pre-press unit 1002, the digital printing unit 1003, and the post-press unit 1004 to perform operations, and totally manages a workflow.

Further, the process management unit 1001 receives a job from an end user as described above or stores jobs sent from end users.

The process management unit 1001 further assembles operations in the respective processes to set up a workflow in accordance with a job specified by an end user, or generates a schedule for efficient processing.

The pre-press unit 1002 scans a paper document received from an end user using a scanning device such as a scanner or a multifunction peripheral (MFP) in accordance with a pre-press job operation instruction received from the process management unit 1001. Then, the pre-press unit 1002 captures a scanned image file obtained as a result of the scanning process.

The pre-press unit 1002 also executes image correction, file merge, page insertion/deletion, various page layout editing processes, or imposition processing. The pre-press unit 1002 also outputs a proof, as necessary, to check the layout and color tint of a final product.

The digital printing unit 1003 copies a paper document using a monochrome MFP, a color MFP, or the like in accordance with a work instruction of a print job received from the process management unit 1001 or the pre-press unit 1002.

The digital printing unit 1003 further prints a document/image file received using a client PC from an end user through a printer driver or hot folder by using a monochrome MFP, a color MFP, or the like.

The post-press unit 1004 controls post-processing devices in accordance with a work instruction of a post-press job received from the process management unit 1001, the pre-press unit 1002, or the digital printing unit 1003. The post-processing devices include a paper folding machine, a saddle sticker, a case binding machine, a cutting machine, an inserter, and a collator.

The post-press unit 1004 further executes finishing processes, such as paper folding, saddle stitching, case binding, cutting, insertion, and collation, on a recording sheet output from the digital printing unit 1003.

Configuration of Printing System

Figure 2A:
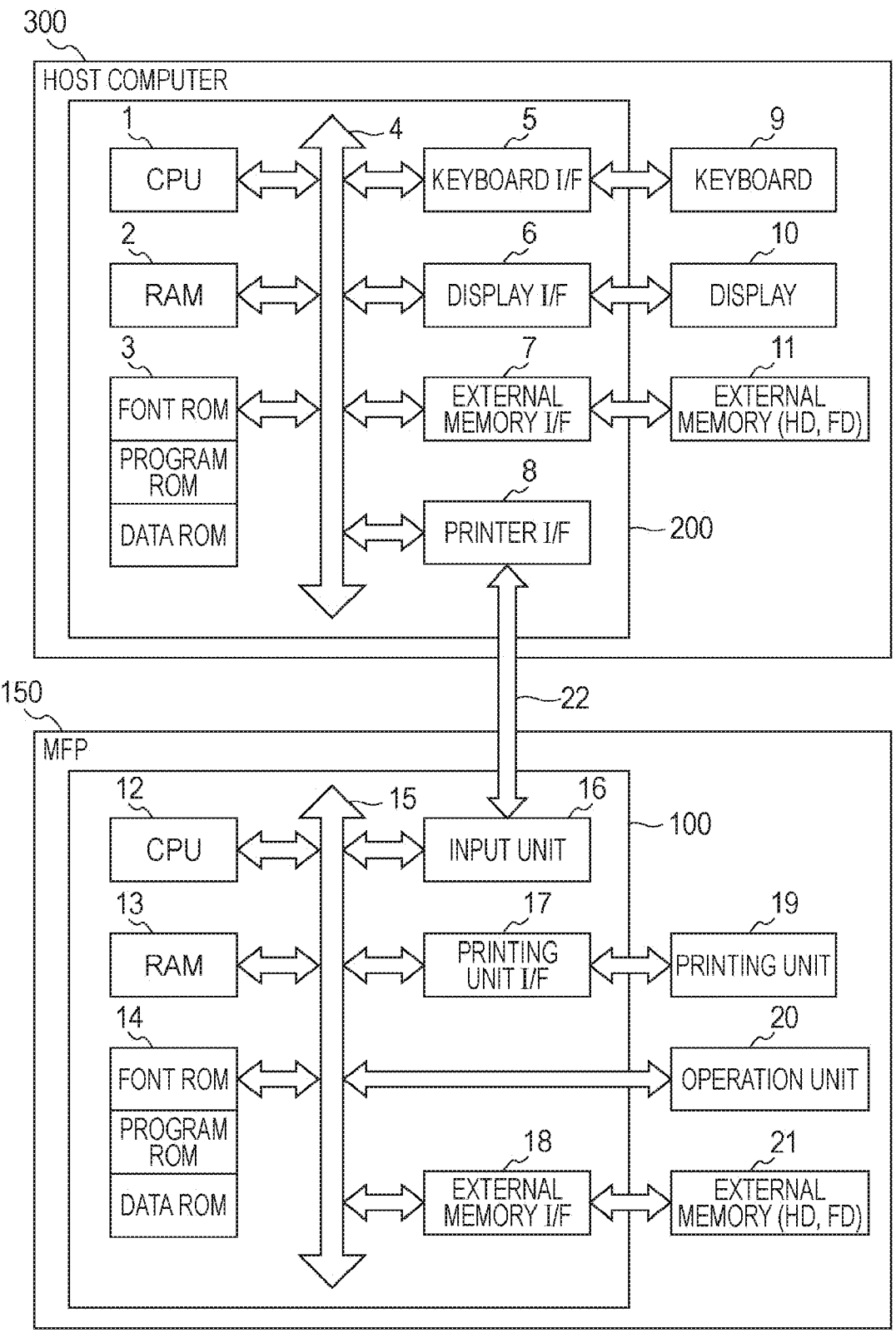
FIG. 2A is a diagram showing an example configuration of a host computer.

FIG. 2A is a block diagram showing the configuration of a printing system according to the present embodiment in which an information processing apparatus and an image forming apparatus can communicate with each other. The present embodiment provides an example of an information processing system configured to transfer variable print data created by a host computer to an MFP capable of performing two-way communication for output.

In FIG. 2A, a host computer 300 includes a central processing unit (CPU) 1. The CPU 1 processes a document including a figure, an image, letters, a table (including a spreadsheet and the like), and the like according to a document processing program or the like stored in a read-only memory (ROM) 3, namely, in a program ROM, or an external memory 11. The ROM 3 also stores a control program for executing the present embodiment.

The CPU 1 further controls the overall operation of individual devices connected to a system bus 4. The program ROM in the ROM 3 or the external memory 11 also stores an operating system (OS) serving as a control program for the CPU 1 and the like.

A font ROM in the ROM 3 or the external memory 11 stores font data and the like that are used for the document processing described above. A data ROM in the ROM 3 or the external memory 11 stores various data used for the document processing described above and the like.

A random access memory (RAM) 2 functions as a main memory, a work area, or the like for the CPU 1. A keyboard interface (I/F) 5 controls a key input from a keyboard 9 or a pointing device (not shown).

A display I/F 6 controls the display on a display 10. An external memory I/F 7 controls access to the external memory 11 which may be implemented by a hard disk (HD), a flexible disk (FD) or the like. The external memory 11 stores a boot program, various applications, font data, a user file, an edited file, and a printer driver having a module shown in FIG. 2B, which will be described below, and the like.

A printer I/F 8 is connected to an MFP 150 through a predetermined bidirectional interface 22, and executes a control process of communication with the MFP 150.

For example, the CPU 1 executes a process for developing (rasterizing) an outline font on, for example, a display information RAM configured in the RAM 2 to enable WYSIWYG display on the display 10.

Further, the CPU 1 opens various windows registered on the basis of commands given through a mouse cursor (not shown) on the display 10 or the like, and executes various data processes. In order to print information created by an application, a user opens a user interface for setting the information on the display 10 in order to set the MFP 150 or select a print mode. In this case, the user is allowed to set various print processing methods through a user interface provided by a printer driver.

The MFP 150 includes a printer CPU (CPU) 12. The CPU 12 outputs an image signal serving as output information to a printing unit (printer engine) 19 through a printing unit I/F 17 connected to a system bus 15 according to a control program or the like stored in a program ROM in a ROM 14 or an external memory 21.

The program ROM in the ROM 14 also stores a control program for the CPU 12 and the like. A font ROM in the ROM 14 stores font data and the like that are used for generating the output information.

A data ROM in the ROM 14 stores information and the like that are used on the host computer 300 when the MFP 150 is a printer having no external memory 21 such as a hard disk.

The CPU 12 is capable of performing bidirectional communication with the host computer 300 through an input unit 16, and is configured such that information and the like stored in the MFP 150 can be communicated to the host computer 300. The information contains the status of the printer engine, network setting information, a device name, a resource name, and the like.

A RAM 13 functions as a main memory, a work area, or the like for the CPU 12, and is configured such that the memory capacity can be expanded by an option RAM connected to an expansion port (not shown).

The RAM 13 may be used as an output information development area, an environment data storage area, a non-volatile RAM (NVRAM), or the like. Access to the external memory 21 such as a hard disk (HD) or an IC card as described above is controlled by an external memory I/F 18.

The external memory 21 is connected as option, and is configured to store font data, an emulation program, form data, and the like.

The number of external memories 21 is not limited to one, and at least one external memory 21 is provided. A plurality of external memories each storing, in addition to internal fonts, an optional font card and a program for interpreting printer control languages of different language systems can be connected.

An NVRAM (not shown) may also be provided to store printer mode setting information supplied from an operation unit 20. The RAM 13 or the external memory 21 can be configured to store form data sent from the host computer 300. When overlay printing is performed, form data specified in the print setting is extracted, overlaid, and printed. The operation unit 20 has a switch, a liquid crystal display (LED) indicator, and the like for operation.

The information processing apparatus according to the present embodiment has the following mechanism: An application for creating PPML data in a manner described below is executed to perform a process of reordering the records so that the MFP 150 can efficiently process variable print data. A process of calculating the memory use amount for the MFP 150 is also performed to process variable print data. Then, the print data in which the records are reordered is transferred via a system spooler loaded into the RAM 2 by the OS, and is output as, for example, XML print data to the MFP 150 through the interface 22 shown in FIG. 2A.

Configuration of MFP

Next, the configuration of an image forming apparatus will be described with reference to FIG. 2B. In the present embodiment, the image forming apparatus is configured as the MFP 150 shown in FIG. 2A.

FIG. 2B is a block diagram illustrating an example configuration of the image forming apparatus according to the present embodiment. In the example shown in FIG. 2B, an example configuration of an MFP is illustrated. An MFP control unit 2001, which will be described below, includes hardware resources such as the CPU 12, the ROM 14, and the RAM 13 shown in FIG. 2A, and controls various processes by loading modules into a RAM and executing the modules. The modules include modules that function as an interpreter unit and a rendering unit shown in FIG. 3.

In FIG. 2B, an input image processing unit 2002 reads a paper document using an image reading device such as a scanner, and performs image processing on read image data.

A network interface card (NIC) unit 2003 passes image data (mainly, page description language (PDL) data) input via a network to a raster image processor (RIP) unit 2006. The NIC unit 2003 further sends image data stored in the MFP or device information to the outside via a network.

The RIP unit 2006 interprets the input PDL data and performs RIP development.

Subsequently, the input image data is sent to the MFP control unit 2001. The MFP control unit 2001 is configured to control input data or data to be output. The image data input to the MFP control unit 2001 is temporarily stored in a memory unit 2005. The image data stored in the memory unit 2005 is retrieved as necessary and output to an output image processing unit 2007.

The output image processing unit 2007 executes image processing for printing. A printer unit 2008 feeds sheets and sequentially prints image data created by the output image processing unit 2007 on the sheets. The printed sheets are delivered to a post-processing unit 2009 for sorting or finishing the sheets.

An operation unit 2004 is used for selecting the various flows or functions described above or instructing the operations thereof.

In this manner, the MFP has various functions and usages. Following are examples thereof.

A first function is a copying function. Data is processed by the input image processing unit 2002, the output image processing unit 2007, and the printer unit 2008 in this order, thereby achieving copying of a paper document.

A second function is a network scan function. Data is processed by the input image processing unit 2002 and the NIC unit 2003 in this order, thereby achieving network scanning.

A third function is a network print function. Data is processed by the NIC unit 2003, the RIP unit 2006, the output image processing unit 2007, and the printer unit 2008 in this order, thereby achieving network printing.

A fourth function is a box scan function. Data is processed by the input image processing unit 2002, the output image processing unit 2007, and the memory unit 2005 in this order, thereby achieving box scanning.

A fifth function is a box print function. Data is processed by the memory unit 2005 and the printer unit 2008 in this order, thereby achieving box printing.

A sixth function is a box reception function. Data is processed by the NIC unit 2003, the RIP unit 2006, the output image processing unit 2007, and the memory unit 2005 in this order, thereby achieving box reception.

A seventh function is box transmission function. Data is processed by the memory unit 2005 and the NIC unit 2003 in this order, thereby achieving box transmission.

An eighth function is a preview function. Data is processed by the memory unit 2005 and the operation unit 2004 in this order, thereby achieving preview.

Configuration of RIP

FIG. 3 is a block diagram illustrating the configuration of the RIP unit 2006 shown in FIG. 2B.

An RIP is a processor for developing object information into a bitmap (raster image) on a memory provided in an image forming apparatus. More specifically, an RIP performs a process of reproducing vector information such as characters, line drawings, and figures described in PDL, image scanning line information such as colors, patterns, and photographs, or the like on a page.

Conventionally, the RIP unit 2006 is mounted as hardware in the image forming apparatus. Currently, however, due to the increased speed of CPUs, the RIP unit 2006 can also be implemented by executing software (module) loaded into a RAM. In the present invention, either method may be used.

In FIG. 3, the RIP unit 2006 is generally composed of two sections, an interpreter unit 3100 and a rendering unit 3200. The interpreter unit 3100 includes a PDL interpretation unit 3102 that performs PDL translation, and a display list (DL) generation unit 3103 that generates an intermediate file called display list from interpreted PDL data. The interpreter unit 3100 further includes a PPML interpretation unit 3101 that interprets PPML data having a data structure described below.

The rendering unit 3200 includes a color matching module (CMM) unit 3201 that performs color matching on the display list, and a DL development unit 3204 that develops the display list into a bitmap (raster image).

The PDL interpretation unit 3102 analyzes various types of input PDL data. Some of the popular input formats of PDL data include the Adobe PostScript (registered trademark) (PS) language and the Hewlett-Packard (HP) Printer Control Language (PCL) language. These formats are described in printer control code for creating images on a page-by-page basis, and contain, as well as simple character code, drawing code, photograph code, and the like.

Further, an electronic document file in the Portable Document Format (PDF) file format, which was developed by Adobe Systems Incorporated, can also be processed. Other formats such as image compression formats including Joint Photographic Experts Group (JPEG) and Tagged Image File Format (TIFF) can also be supported.

When print data created by the information processing apparatus is in a format for Variable Data Print (VDP) such as PPML, that is, when the print data is variable print data, a different processing method from that for other PDLs is adopted. PPML stands for Personalized Print Markup Language. PPML data is composed of three elements: a database, image resources (PDL data), and layout data. Thus, the interpreter unit 3100 in the RIP unit 2006 is provided with the PPML interpretation unit 3101.

The PPML interpretation unit 3101 first analyzes the layout data to determine position information for arranging the image resources. Then, image resources to be used are selected from individual records in the database. The selected image resources are translated by the PDL interpretation unit 3102 and are sent to the DL generation unit 3103 to generate DLs corresponding to the selected PDL data. Further, a DL combining unit 3104 that combines the DLs on the basis of layout information generates a final DL.

The CMM unit 3201 can receive various types of image data such as grayscale data, RGB (Red, Green, Blue) data, and CMYK (Cyan, Magenta, Yellow, Black) data. When data in other color spaces is input, the CMM unit 3201 converts the input data into the CMYK space using a color rendering dictionary (CRD) before performing color matching.

The CMM unit 3201 performs color adjustment using an International Color Consortium (ICC) profile. The ICC profile includes a source profile 3202 and a printer profile 3203. The source profile 3202 is designed to convert RGB (or CMYK) data into data in a standardized L*a*b* space and reconvert the resulting L*a*b* data into the CMYK space which is suitable for a target or a printer.

The source profile 3202 is composed of an RGB profile and a CMYK profile. When an input image is an RGB-based image (such as Microsoft application software, JPEG, or TIFF image), the RGB profile is selected. When an input image is a CMYK-based image (such as part data of Adobe Photoshop image or Illustrator), the CMYK profile is selected.

The printer profile 3203 is created in accordance with the color characteristics of each printer. When the printer profile is designed for RGB-based images, "Perceptual" (which gives priority to colors) or "Saturation" (which gives priority to sharpness) is preferably selected. When the printer profile is a CMYK-based image, "Colorimetric" (color difference is minimum) is typically selected and an optimum image is output.

Further, the ICC profile is generally created in the form of a lookup table. In the source profile 3202, RGB (or CMYK) data input thereto is uniquely converted into L*a*b* data. In the printer profile 3203, conversely, L*a*b* data is converted into CMYK data which is suitable for a printer.

Note that RGB data of which color matching is not necessary is converted into CMYK data using default color conversion and is output and that CMYK data of which color matching is not necessary is directly output.

Example of Variable Print Data

Figure 4:
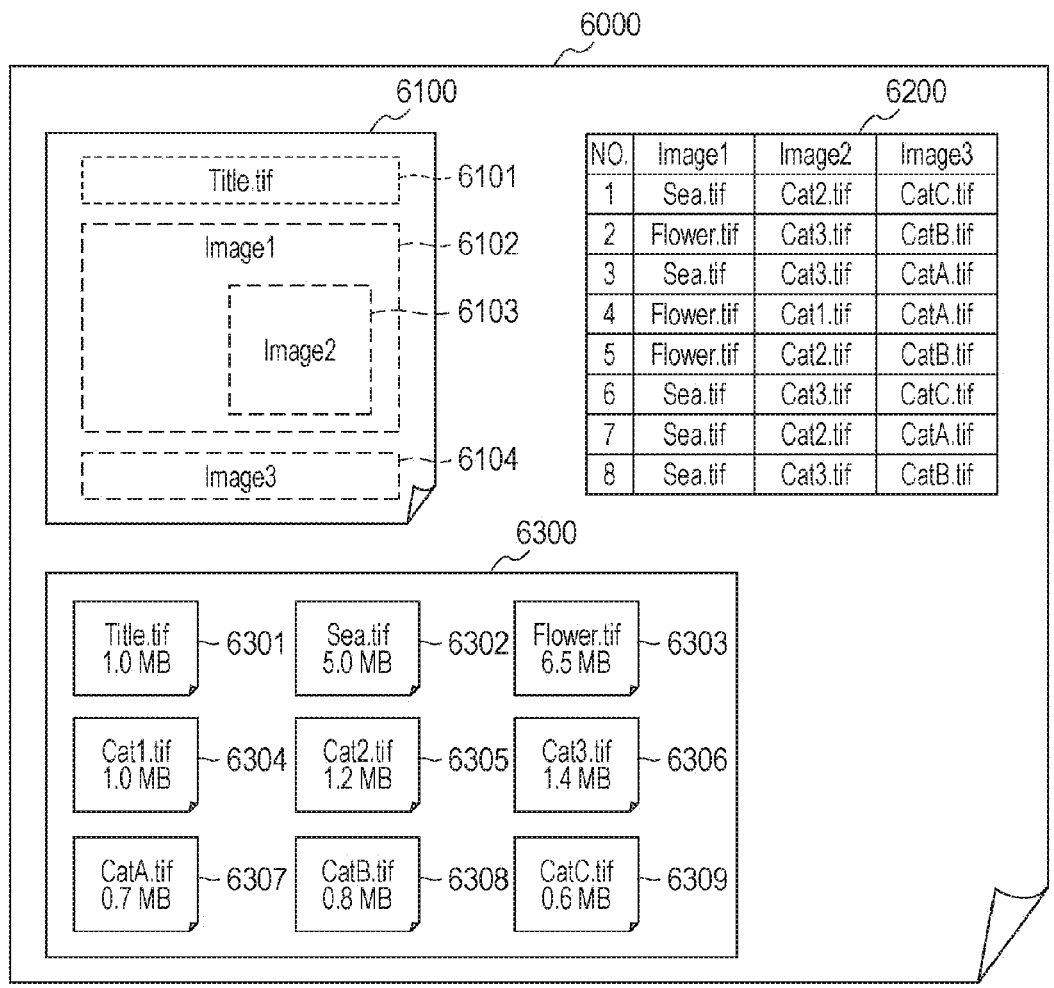
FIG. 4 is a diagram showing an example of variable print data processed by the image forming apparatus.

FIG. 4 is a diagram showing an example of variable print data that is processed by the image forming apparatus according to the present embodiment. In this example, variable print data 6000 created by the information processing apparatus is composed of layout data 6100, a database 6200, and image resources 6300, by way of example.

The layout data 6100 has information about layout frames in which image resources are arranged when variable printing is performed. The layout frames contain pieces of frame information having different attributes. The layout frames include a master data frame to which master data which is common to all records in the database 6200 is allocated, and a variable data frame to which variable data which is different for each record in the database 6200 is allocated.

In this example, the layout data 6100 include a master data frame 6101 and variable data frames 6102 to 6104. The variable data frames 6102 to 6104 are assigned names "Image1" to "Image4", respectively.

The database 6200 holds at least one record, and each record means one copy of print material. Each record contains information about a combination of image resources to be used.

In this example, the database 6200 includes eight records. In Record 1, it is defined that "Sea.tif" is used in the variable data frame 6102 with the name "Image1". It is also defined that "Cat2.tif" is used in the variable data frame 6103 with the name "Image2" and that "CatC.tif" is used in the variable data frame 6104 with the name "Image3". The remaining records are also defined in a similar manner. Here, only information about the variable data frames is stored. Therefore, as used herein, the term "record" refers to a data group composed of a plurality of pieces of data.

The image resources 6300 include pieces of data to be combined into the master data frame 6101 and the variable data frames 6102 to 6104. Electronic document formats such as PS and PDF may be used as image data in the broad sense, as well as image data in the narrow sense such as TIFF and JPEG.

In this example, the image resources 6300 include images 6301 to 6309. Each of the images 6301 to 6309 shows a file name and size in megabytes (MB). For example, the image 6301 has file name "Title.tif" and a data size of 1.0 MB. The remaining images are illustrated in a similar manner.

Variable Printing Flow

Figure 5:
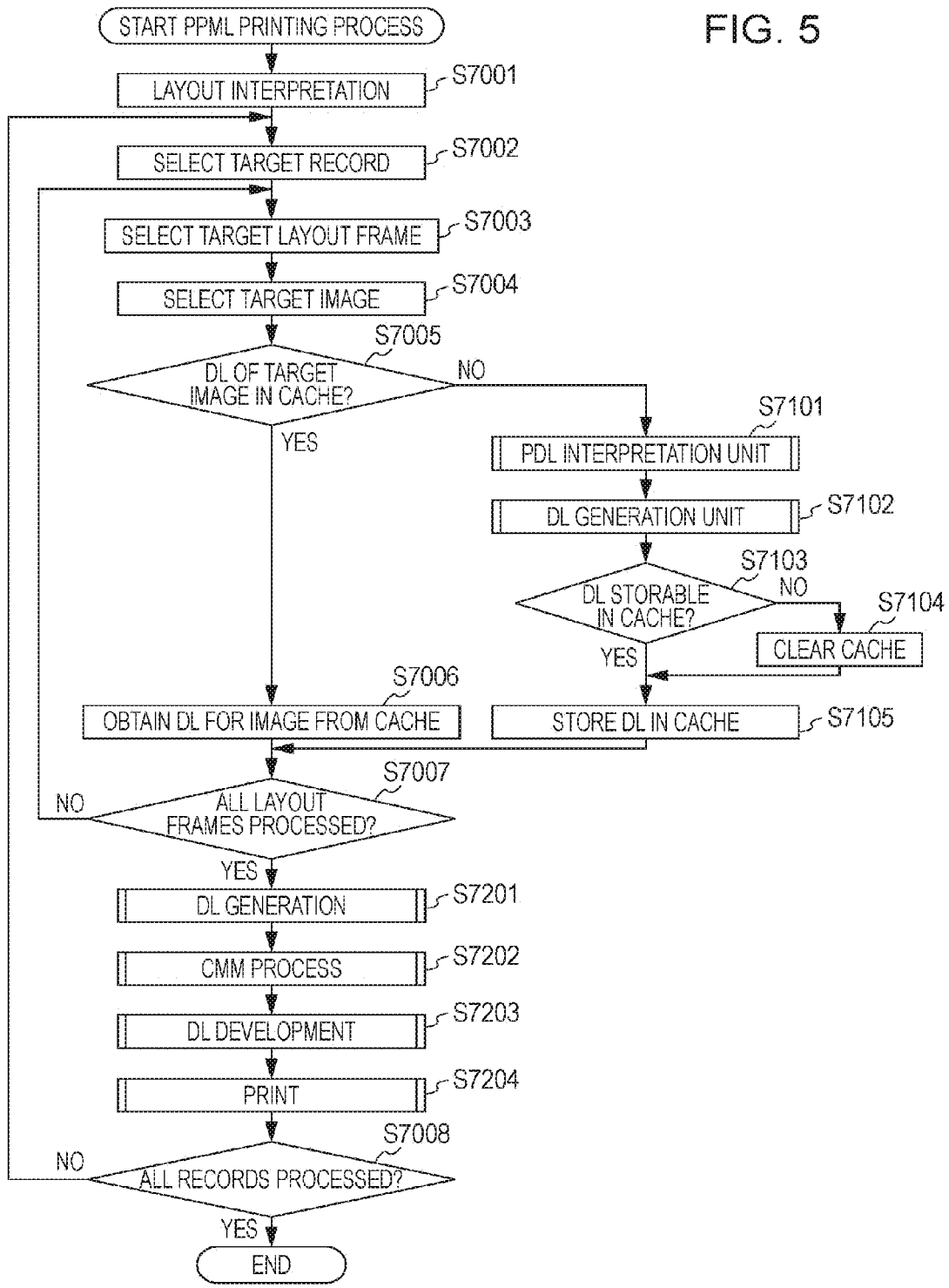
FIG. 5 is a flowchart showing an example of a data process procedure performed in the image forming apparatus.

FIG. 5 is a flowchart showing an example of a data process procedure performed in the image forming apparatus according to the present embodiment. In this example, an example of a PPML printing process based on the variable print data 6000 created by the information processing apparatus is illustrated. Individual steps are represented by numbers with symbol S. Further, the processing of each step is implemented by loading a module into the RAM 13 and executing the module by the CPU 12 provided in the MFP control unit 2001. In the present embodiment, in the following description, the steps are configured as modules executed by a CPU provided in the image forming apparatus (the elements 3101 to 3103 in the interpreter unit 3100 shown in FIG. 3). Although each module is executed by the CPU, the descriptions will be given using the elements 3101 to 3103 for convenience of illustration.

In S7001, first, the PPML interpretation unit 3101 analyzes the layout data 6100 to obtain information about layout frames. The information about layout frames includes the names, widths, heights, and combination conditions of the layout frames.

Then, in S7002, the PPML interpretation unit 3101 analyzes the database 6200 to select a record to be processed. Here, it is assumed that Record 1 is selected.

Then, in S7003, the PPML interpretation unit 3101 selects a layout frame to be processed from the layout frame information obtained in S7001. Here, it is assumed that "Image1" in the database 6200, that is, the variable data frame 6102, is selected.

Then, in S7004, the PPML interpretation unit 3101 selects an image to be used from the database 6200 on the basis of the record number obtained in S7002 and the layout frame selected in S7003. In this example, "Sea.tif" in Record 1 is selected.

Then, in S7005, the PPML interpretation unit 3101 determines whether or not a DL for the image to be used in "Image1" is held in the cache of the RAM 13. If the PPML interpretation unit 3101 determines that the DL is held, then in S7006, the PPML interpretation unit 3101 obtains the DL from the cache.

If the PPML interpretation unit 3101 determines in S7005 that the DL for the target image is not held on the cache, the DL is generated by performing the subsequent processing of S7101 to S7105, and is held on the cache.

Specifically, in S7101, the PPML interpretation unit 3101 interprets the target image. Then, in S7102, the DL generation unit 3103 performs conversion into a DL on the basis of the PDL interpretation result obtained in S7101. Then, in S7103, the PPML interpretation unit 3101 determines whether or not the DL generated in S7102 can be held on the cache. If the PPML interpretation unit 3101 determines that the generated DL cannot be held on the cache, in S7104, the PPML interpretation unit 3101 discards a DL having a low frequency of use from the cache.

If the PPML interpretation unit 3101 determines in S7103 that the cache has an available space to hold, in S1705, the PPML interpretation unit 3101 holds the generated DL in the cache.

Then, in S7007, the PPML interpretation unit 3101 determines whether or not the process described above for one record has been repeated for all the layout frames in the layout data. If the PPML interpretation unit 3101 determines that the process described above for one record has not been repeated for all the layout frames in the layout data, the process returns to S7003.

If the PPML interpretation unit 3101 determines in S7007 that the process described above for one record has been repeated for all the layout frames in the layout data, the process proceeds to S7201 in order to perform an image generation process.

Then, in S7201, the DL generation unit 3103 creates a DL for one page on the basis of the DL created in S7102 or the DL obtained from the cache in S7006.

Then, in S7202, the CMM unit 3201 performs a CMM process on the generated DL to adjust the colors. Then, in S7203, development into image data for one page is performed on the basis of the DL modified in S7202. In S7204, the image data is sent to the printer unit 2008 as print target data, and accordingly printing is executed.

Then, in S7008, the PPML interpretation unit 3101 determines whether or not the process described above has been repeatedly performed on all the records. If the PPML interpretation unit 3101 determines that the process described above has been repeatedly performed on all the records, the process ends.

If the PPML interpretation unit 3101 determines in S7008 that the process described above has not been repeatedly performed on all the records, the process returns to S7002, and a similar process is repeated. Accordingly, variable printing for the variable print data 6000 is executed.

Figure 11A:
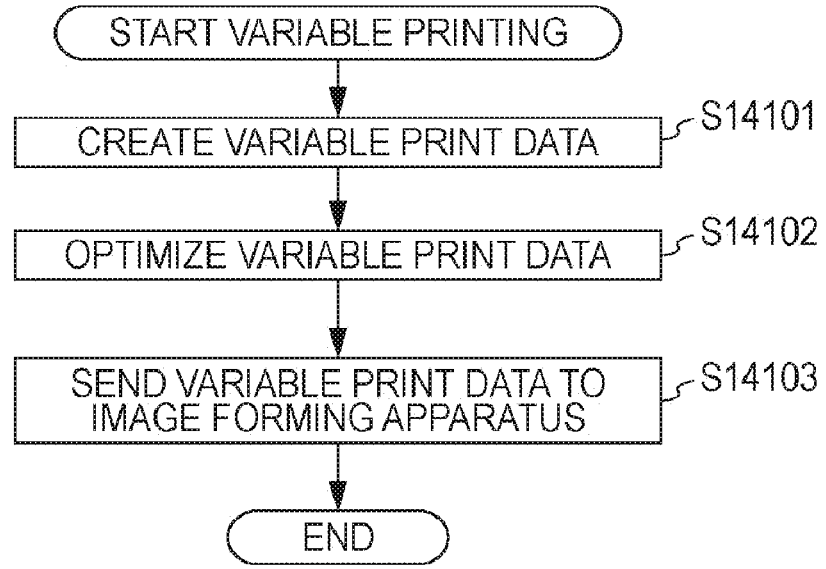
FIG. 11A is a flowchart illustrating a workflow for variable printing.
Figure 11B:
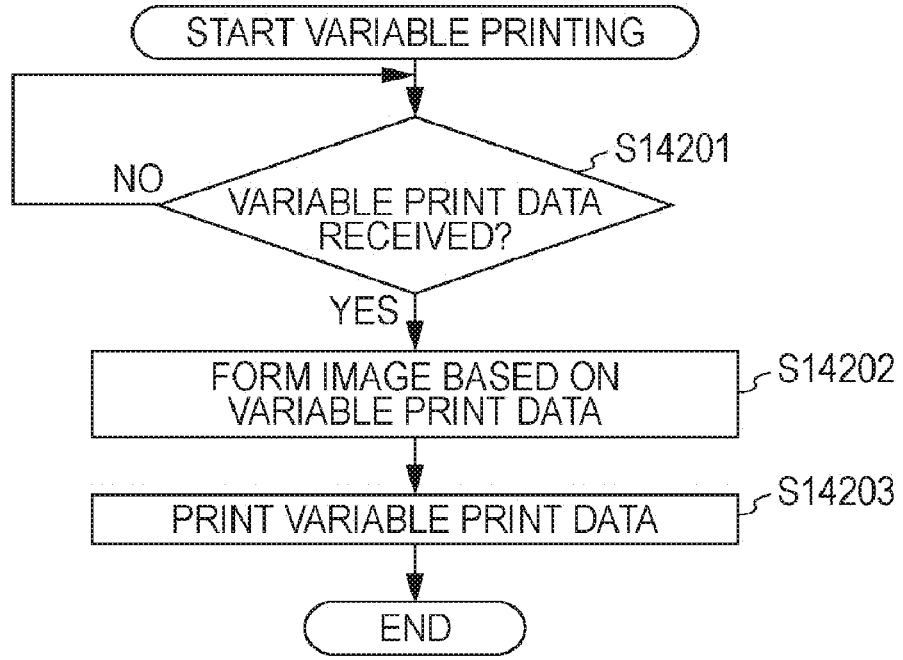
FIG. 11B is a flowchart illustrating a workflow for variable printing.

FIGS. 11A and 11B are flowcharts illustrating work flows for variable printing in the printing system according to the present embodiment. FIG. 11A shows a data process on the host side, and FIG. 11B shows a data process on the device side. Steps S14101 to S14103 are implemented by the CPU 1 in the information processing apparatus on the host side by loading an application compatible with the PPML format into the RAM 2 and executing the application. Steps S14201 to S14203 are implemented by a CPU in a MFP on the device side by loading modules into a RAM and executing the modules.

First, in S14101, the CPU 1 of the host computer 300 executes the application to create variable print data. Then, in S14102, the CPU 1 of the host computer 300 performs an optimization process on the created variable print data by applying the present invention. Then, in S14103, the CPU 1 of the host computer 300 sends the optimized variable print data to the MFP on the device side. Then, the process ends. The optimization process will be described below with reference to FIGS. 6 to 10.

On the other hand, the image forming apparatus receives the variable print data sent from the host computer 300 through the NIC unit 2003 shown in FIG. 2B (S14201), and forms an image from the received variable print data (S14202). The image is printed on a sheet (S14203).

The details of the variable print data creation process performed on the host side will now be described.

On the host side, the application for creating variable print data has mainly three functions. The first is a layout design function. Specifically, this is a function for setting a master data frame and a variable data frame on a page and adjusting the sizes or positions of the frames.

The second is a function for registering an image resource. This is a function for specifying image data to be placed on the layout. The variable print data may be converted into a format suitable for an image forming device in advance as needed.

For example, a portion that is displayed as text can be converted into an image, or an incompatible image format can be converted into a compatible format.

The third is a function for creating a database. This is a function for specifying image data to be used for each print material to be printed. This function may be associated with the image resource registration function.

The application may also have other additional functions such as a function for sending variable print data to the image forming apparatus.

Figure 12:
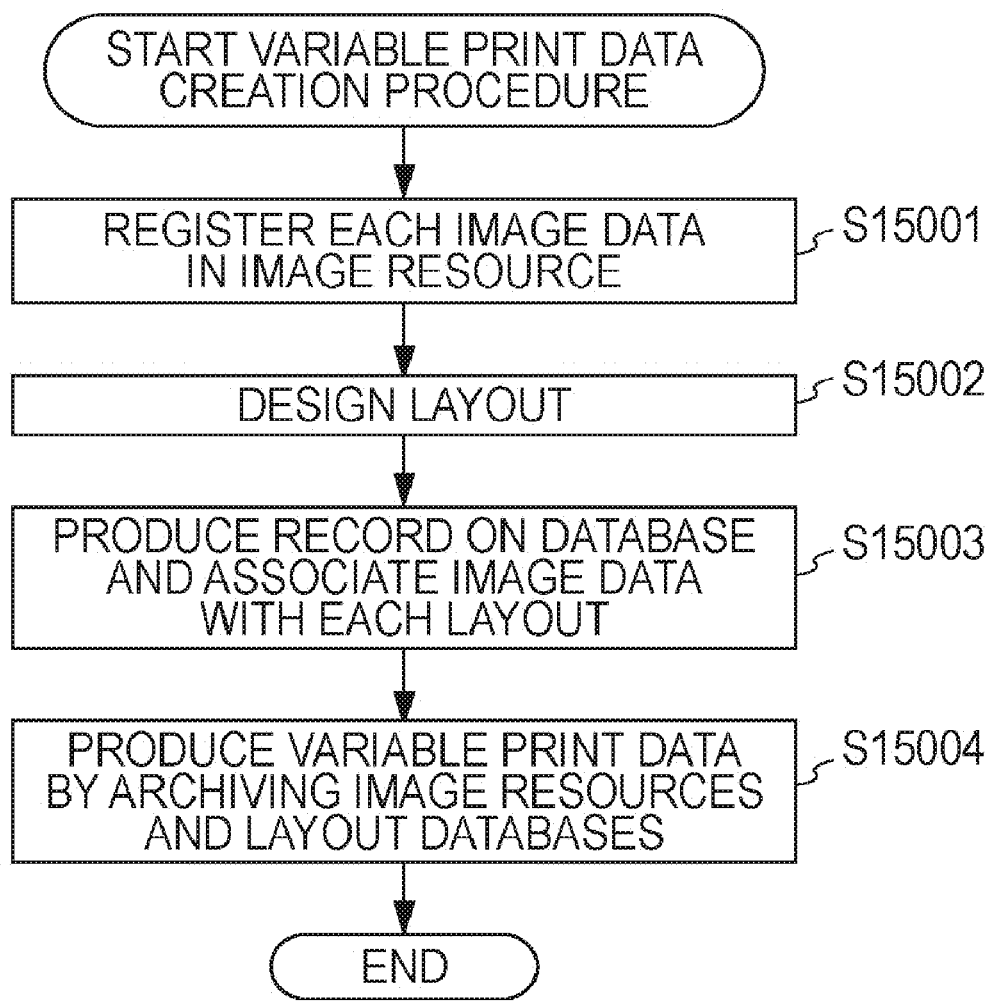
FIG. 12 is a flowchart showing an example of a data process procedure.

FIG. 12 is a flowchart showing an example of a data process procedure performed by the information processing apparatus according to the present embodiment. In this example, an example of a variable print data creation process is illustrated.

In S15001, the information processing apparatus registers image data to be used for variable print data in the RAM 2 or the external memory 11 as image resources.

Then, in S15002, the information processing apparatus designs a layout in accordance with a user instruction. With this process, the layout data 6100 shown in FIG. 4 is generated.

Further, in S15003, the information processing apparatus creates a record on the database 6200 shown in FIG. 4, and registers an image to be allocated to each layout frame. For example, in Record 1, "Sea.tif" is registered so as to be allocated to the "Image1" frame in the layout data 6100.

When all records are created, then in S15004, the information processing apparatus produces variable print data by archiving image resources, layout data, and databases.

The processes in S15001 to S15004 may be performed in parallel or each of the processes may be returned to the previous process. For example, if the images are not sufficient in the layout design, image data may be added to the image resources. Further, if the layout is unacceptable during the production of an individual record in a database, the layout may be changed at this time.

In the present embodiment, in the foregoing description, in S15003, an optimization process is performed on the database 6200 during or immediately after the production of an individual record on the database 6200. This allows a user to check a result of the optimization. Note that the optimization process corresponding to the processing of S14102 may be performed when variable print data is finally archived.

Process for Optimizing Record Order

Figure 6:
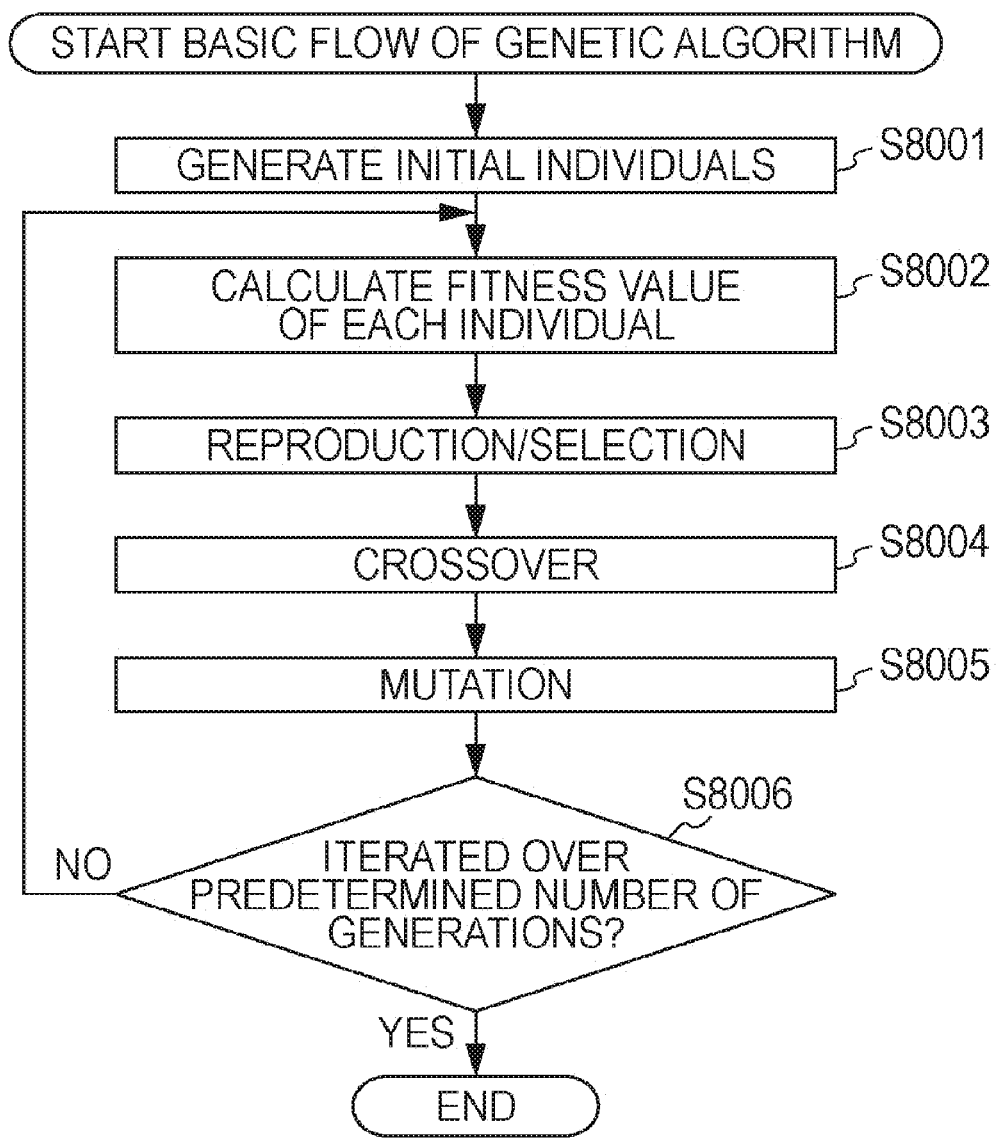
FIG. 6 is a flowchart illustrating a genetic algorithm which is generally used.

Next, the variable print data optimization process described above with reference to FIG. 11A will be described. In the present embodiment, an example method for optimizing the record order using a genetic algorithm shown in FIG. 6 is performed.

In the genetic algorithm, candidate solutions to a given problem are called "genes", and one unit having genes is called an "individual". A quantitative evaluation of an individual for this problem is called "fitness value". The gene format is changed depending on the problem. The genetic algorithm is iterated a specified number of times. Each iteration is called a "generation".

In the genetic algorithm, first, in S8001, the information processing apparatus generates an initial set of individuals. Then, in S8002, the information processing apparatus calculates the fitness value of each individual. The method for calculating the fitness value will be described in detail with reference to FIGS. 8 and 10. Then, in S8003, the information processing apparatus performs reproduction/selection. This process is a process for improving the overall fitness value of the population of individuals by removing individuals having low fitness values and instead increasing the number of individuals having high fitness values. In S8004, the information processing apparatus performs crossover on an individual. The term "crossover" (recombination) is based on the model of biological regeneration to produce offspring by crossing and refers to an operation for exchanging some genes of an individual. Due to its nature, crossover is the most important genetic operation. In S8005, the information processing apparatus performs mutation on an individual. The term "mutation" refers to a process for changing some genes at a certain rate. The mutation allows the production of as-yet-unknown combination patterns. Then, in S8006, the information processing apparatus iterates the genetic algorithm over a specified number of generations.

The above algorithm allows individuals having high fitness values to be selected by reproduction over individuals having low fitness values. Therefore, a candidate solution approximates to the optimal solution. In addition, crossover or mutation allows the production of unknown individuals to avoid convergence to a local solution.

Figure 7:
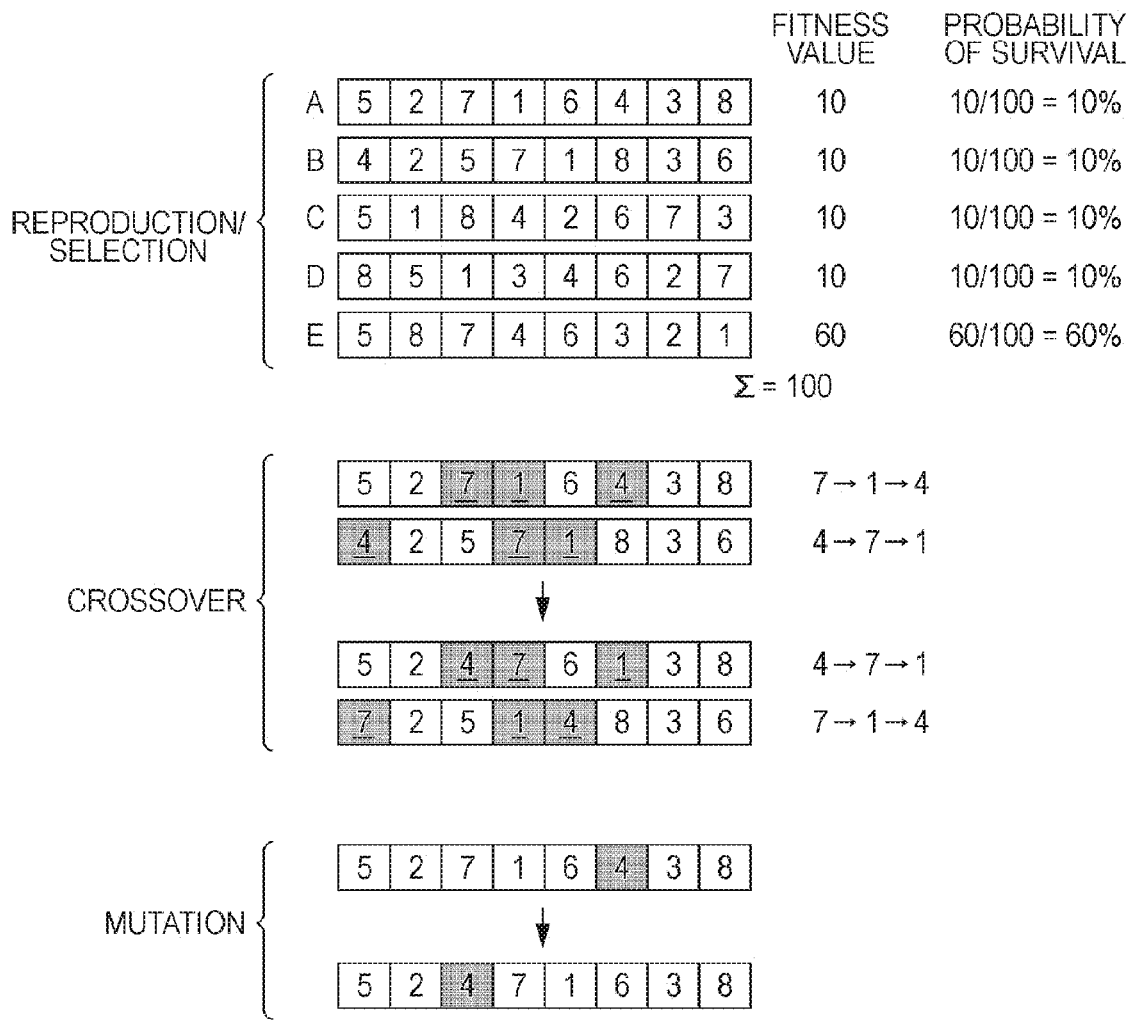
FIG. 7 is a diagram illustrating various operations based on the genetic algorithm.

FIG. 7 is a diagram illustrating various operations based on the genetic algorithm.

For example, "13425678" means that the records are processed in the order of Record 1, Record 3, Record 4, and so on. No redundancy of component is allowed. In "11234567", Record 1 is redundantly processed while Record 8 to be processed is not processed. An individual having such a string is handled as an individual having a low fitness value. A record optimization process will now be described by applying the process shown in FIG. 6.

In the initial generation of individuals, an individual having a string whose order matches the record numbers, such as "12345678", is first generated as an initial value. In the string, two components are selected and exchanged. This operation is repeated to generate a new individual. For example, the second and fourth components are exchanged, thereby generating an individual having "14325678". This operation is repeated a number of times corresponding to the number of individuals so that the generation of an individual for which one record is processed two or more times can be prevented.

Here, reproduction/selection can be processed using a combination of a roulette rule, which is generally used in a genetic algorithm, and an elite strategy. The roulette rule is a rule for determining whether or not an individual is to be preserved in the next generation on the basis of the relative magnitude of the fitness value thereof.

For example, it is assumed that five individuals A to E have fitness values {A, B, C, D, E}={10, 10, 10, 10, 60}, respectively. The sum of the fitness values is given by (10+10+10+10+60=100). Thus, the probabilities of survival of the individuals in the next generation are $P(A)=P(B)=P(C)=P(D)=10\%$ and $P(E)=60\%$, respectively. Note that, even in this case, the individual E having the highest fitness value may not necessarily survive in the next generation.

The elite strategy is a rule for preserving an individual having a high fitness value as an elite. For example, a strategy for preserving the upper one-third of the number of individuals or individuals having the average fitness value or higher in all the individuals can be used. This can eliminate individuals having low fitness values.

Further, the term "crossover" refers to a process for producing a new individual that inherits the features of two or more individuals based on the nature of the individuals. However, as described above, since it is not permitted to use the same record two or more times, it is difficult to directly combine conventional strings. As an alternative, therefore, two or more components are selected and the values thereof are exchanged to generate a new individual.

For example, as shown in FIG. 7, individuals having "52716438" and "42571836" exist, and it is assumed that 1, 4, and 7 are selected as components to be subjected to crossover. In the former individual, the components 1, 4, and 7 appear in the order of 7, 1, and 4. In the latter individual, on the other hand, the components 1, 4, and 7 appear in the order of 4, 7, and 1. By reordering the corresponding components, as shown in FIG. 7, individuals having "52476138" and "72514836" are obtained. The crossover process can exchange the relative positions of specific components.

Further, the term "mutation" refers to a process for forcibly changing the genes of a certain individual. As in crossover, it is difficult to simply change the values in the string. In the present example, mutation is implemented by moving one component in the string to a random position.

For example, as shown in FIG. 7, an individual having "52716438" exists, and it is assumed that 4 is selected as a component to be subjected to mutation and that the third position is selected. In this case, an individual having "52471638" is obtained. The mutation process can generate a positional relationship that has not yet existed.

Next, a method for calculating the fitness value will be described with reference to FIGS. 8, 9A, 9B, and 10.

Figure 10:
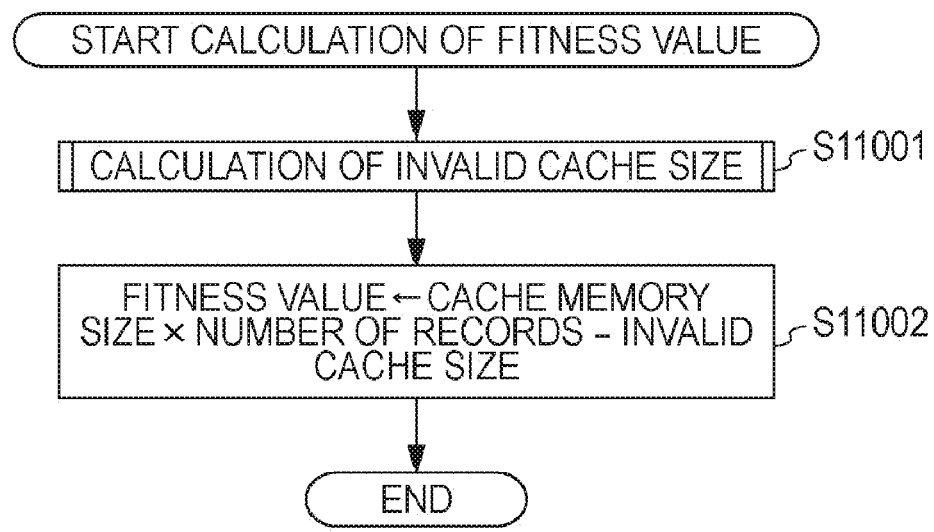
FIG. 10 is a flowchart showing an example of a data process procedure.

FIG. 10 is a flowchart showing an example of a data process procedure performed in the information processing apparatus according to the present embodiment.

First, in S11001, the information processing apparatus calculates an invalid cache size. The processing of S11001 will be described in detail with reference to FIG. 8.

Then, the information processing apparatus multiplies the cache memory size by the number of records, and subtracts the invalid cache size from the product (S11002).

Figure 8:
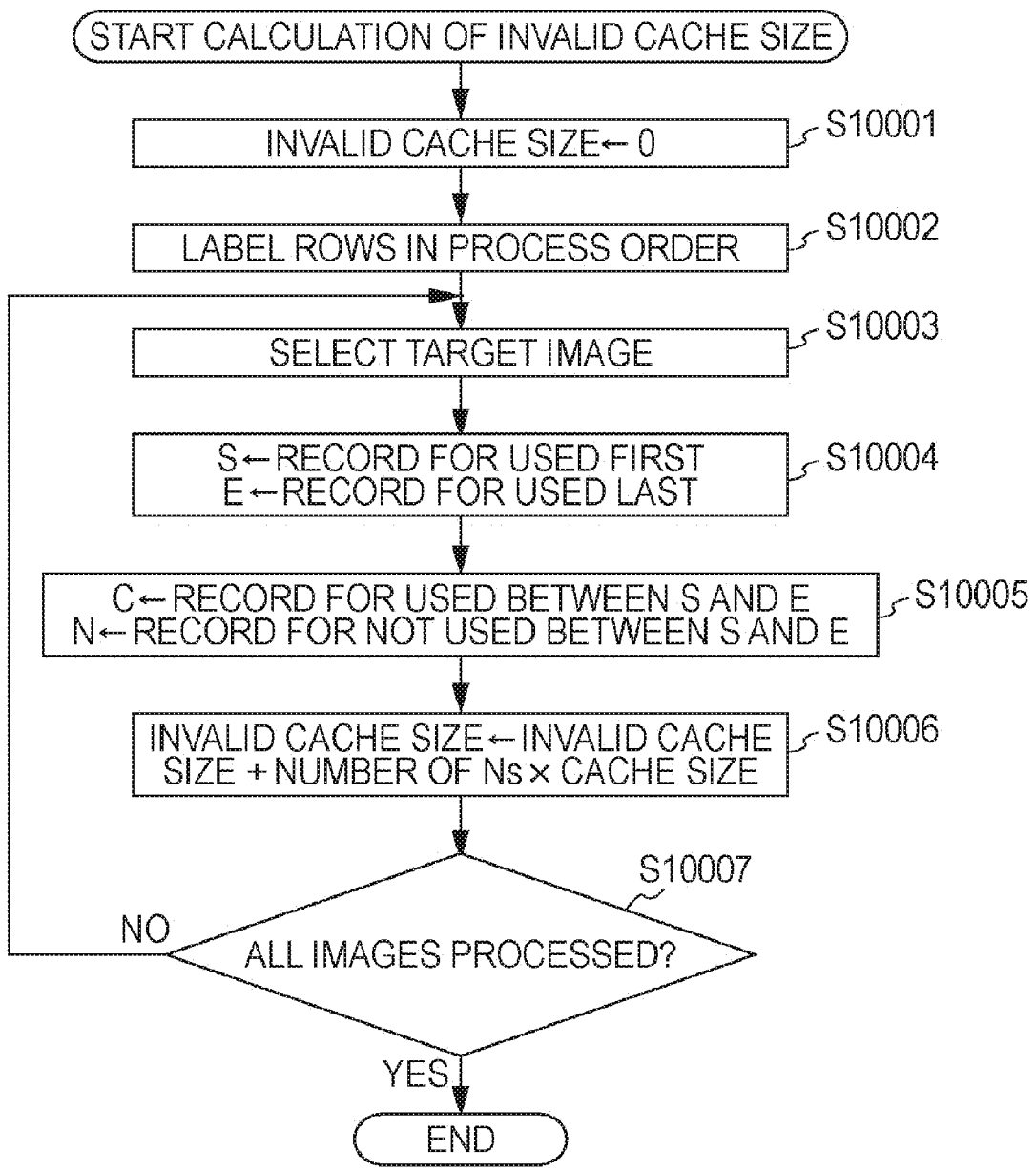
FIG. 8 is a flowchart showing an example of a data process procedure according to the embodiment.

FIG. 8 is a flowchart illustrating the processing of S11001 shown in FIG. 10 in more detail.

First, in S10001, the information processing apparatus initializes the invalid cache size which is reserved on the RAM to "0", and maps the process order into each row of a process order matrix shown in FIG. 9A. In this example, the records are processed in the order of "12345678". In this example, therefore, the process order matches the record numbers.

Then, in S10003, the information processing apparatus selects a target image from among the image resources 6300 shown in FIG. 4. Here, it is assumed that the "Sea.tif" image 6302 is selected from among the image resources 6300 shown in FIG. 4. Any image can be selected.

In S10004, the information processing apparatus inputs "S" for a record in which the image selected in S10003 is used first and inputs "E" for a record in which the image is used last. In a specific example, as shown in FIG. 4, "Sea.tif" is used first in Record 1 and is used last in Record 8. Thus, for "Sea.tif", "S" is assigned to Record 1 and "E" is assigned to Record 8 in the processing of S10004. Therefore, the first row shown in FIG. 9A is obtained.

Then, in S10005, the information processing apparatus determines a record located between the records assigned "S" and "E" in which the image selected in S10003 is used and a record located therebetween in which the image is not used. In a specific example, as shown in FIG. 4, "Sea.tif" is used in Records 3, 6, and 7 and is not used in Records 2, 4, and 5. Therefore, the result shown in the first row shown in FIG. 9A is obtained.

The processing up to S10005 enables the calculation of the number of records that are stored in the cache but do not use the target image selected in S10003. In a specific example, it can be determined that "Sea.tif" is not used in three records.

Then, in S10006, the information processing apparatus multiplies the number of records that are represented by symbol N by the size of the image selected in S10003 to calculate the invalid cache size.

Further, some PPML interpreters may hold an image resource in form of being developed. In this case, if the information processing apparatus is capable of determining whether the image resource contains a photographic image or an illustration image, the compression rate may be added as a coefficient.

For example, lossy compression can provide a compression rate of about 75% for photographic images and a compression rate of about 5 to 15% for illustration images. Accordingly, by considering an expected compression rate as a weight, an approximate calculation of the invalid cache size can be performed without actually developing data.

In addition, an image resource that is used only once may be excluded from the calculation of the invalid cache size, and variable print data may further be processed so that this image resource is not cached. For example, information in direct mail, such as the recipient's address or name, frequently changes, and therefore the caching of such information would not lead to a reduction in processing time.

Then, in S10007, the information processing apparatus determines whether or not the processing of steps S10003 to S10006 has been executed on all the images. If it is determined that the processing has not been repeated, the process returns to S10003.

If the information processing apparatus determines in S10007 that the above processing has been repeated for all the images, the process ends.

The above processes shown in FIGS. 10 and 8 are executed on individuals generated by the flow of the genetic algorithm shown in FIG. 6, thereby calculating the invalid cache size for the process order of all possible combinations of individuals.

FIG. 9A shows a result of calculating the invalid cache size when processing is performed in the order of the records without applying the present invention, that is, a result of calculating the invalid cache size for an individual having genes "12345678". In this case, the cache may not necessarily be effectively used for all the images, except for "Cat1.tif", which is used for only one record. Specifically, since "CatC.tif" is used in Record 1 and is used next in Record 6 without being used in Records 2 to 5, it is necessary to cache "CatC.tif" also for the time period of Records 2 to 5. The size of the cache in which unused image data is stored is the invalid cache size. When the invalid cache size is calculated for all the images, the process order shown in FIG. 9A requires an invalid cache size of 37.5 MB.

FIG. 9B shows an example of a result of calculating the invalid cache size using an optimization process. In the example shown in FIG. 9B, the optimization process according to the present embodiment is performed to obtain "45283671" by way of example. In this case, a total invalid cache size of 8.2 M is required, thus achieving a reduction to about a quarter of that when the optimization process is not performed.

In the present embodiment, variable print data is generated so that printing can be executed in the record processing order that is determined by the optimization process executed by the information processing apparatus, and is sent to the image forming apparatus.

Consequently, the image forming apparatus can reduce the period of time for which unused image data is stored, and can minimize the invalid cache size. In the genetic algorithm, a result might not necessarily be uniquely determined depending on the initial population or the parameters used for the operations. Thus, an individual with a non-minimum invalid cache size may be derived as a solution. Even the result obtained in this case is more efficient than that obtained when the optimization process is not completely performed, and therefore this solution can be used.

While in the present embodiment, the case where the above process is performed by the information processing apparatus has been described, the optimization process may be performed by the image forming apparatus.

In the foregoing embodiment, furthermore, the method for evaluation based only on data without taking the performance of the image forming apparatus into consideration has been described. However, the optimization process may also be performed on the basis of the performance of one or more devices that perform printing. Examples of useful information include the cache size available on the image forming apparatus, and the format in which image data is held so as to be reusable. Further, the cache size that is available on the image forming apparatus is taken into consideration, and a transition in the actual use amount of memory is simulated. Therefore, the printing order that allows an improved cache hit rate can be determined.

Furthermore, in the related art, it is required that the printing order be changed. However, this requirement can be overcome by determining whether or not the image forming apparatus has a printing order correction function.

Specifically, a process of obtaining the performance of the image forming apparatus is executed on the host side to check whether it is possible to correct the printing order. When it is determined on the host side that the image forming apparatus is capable of correcting the printing order, hint information indicating the record printing order is added to the generated variable print data. Then, after forming images, the image forming apparatus performs rearrangement so that the correct order can be obtained for printing on the basis of the hint information assigned to the variable print data.

Furthermore, a database may be divided into two or more (any number of) sections in advance before the optimization process is performed. The implementation of the printing order correction function described above may involve an increase in the size of data to be temporarily held if the number of records that are stored in the database is excessively large. Accordingly, the division in units of pages that can be processed is performed in advance, and the optimization process can be performed for each page.

Furthermore, after the optimization process described above is executed, a database may be divided into a plurality of sections and the sections may be processed using two or more devices. That is, as can be understood, entirely optimized data is also desirable for each part thereof.

Therefore, even when the plurality of obtained database sections are processed using a plurality of devices, the efficiency achieved by the present invention can also be maintained.

In the present embodiment, the example where PPML-compliant variable print data is processed in a printing system including an information processing apparatus that can communicate with an image forming apparatus including an MFP has been described. However, a user of a data processing device may be notified of an evaluation result of the record order through a user interface (not shown).

Furthermore, the optimization process may be executed at the time when variable print data is input or output. Moreover, a program implementing the above processes can be implemented by using a storage medium. The program may also be downloaded into the data processing device from a server device and may be implemented.

Accordingly, when variable print data is created, the record order can be optimized. In this case, the load on the image forming apparatus can be reduced. In addition, since the record order which is desirable even for a device to which the present invention is not applied is set in advance, the data processing speed of the entire printing system can be improved.

Furthermore, in a case where the image forming apparatus holds a print image in a storage device for security protection, the similarity between the previous image and the image currently being processed can be utilized and only the difference between the images can be efficiently held.

In the foregoing embodiment, a pattern having a minimum invalid cache size is selected from among all combination patterns. Alternatively, a pattern having a minimum invalid cache size may be selected from among a plurality of randomly selected combination patterns.

According to the present invention, variable print data that can be efficiently processed by the image forming apparatus can be created.

The present invention can also be implemented by executing the following processes: supplying software (program) implementing the functions of the foregoing embodiment to a system or an apparatus via a network or various storage media, and reading and executing the program by using a computer (or a CPU, a microprocessing unit (MPU), or the like) of the system or apparatus. In this case, the program and the storage media storing the program may constitute embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-226625 filed Sep. 4, 2008, which is hereby incorporated by reference herein in its entirety.

What is claimed is:

1. An information processing apparatus for processing variable print data including a plurality of records and layout data, each record indicating that a plurality of pieces of image data are used, the information processing apparatus comprising:
   a specifying unit configured to specify the number of records in which a piece of image data selected from among the plurality of pieces of image data is not used, the records being located between a record in which the piece of image data is used first and a record in which the piece of image data is used last;
   a deriving unit configured to derive an invalid cache size in accordance with the number of records specified by the specifying unit and a data amount of the piece of image data, the invalid cache size being a size for storing a piece of image data that is not used in a record located between a record in which the piece of image data is used first and a record in which the piece of image data is used last; and
   a determining unit configured to determine a process order for a record having a minimum invalid cache size with respect to a plurality of combinations of process order for the plurality of records.

2. A control method for processing variable print data including a plurality of records and layout data, each record indicating that a plurality of pieces of image data are used, the control method comprising:
   a specifying step of specifying the number of records in which a piece of image data selected from among the plurality of pieces of image data is not used, the records being located between a record in which the piece of image data is used first and a record in which the piece of image data is used last;
   a deriving step of deriving an invalid cache size in accordance with the number of records specified in the specifying step and a data amount of the piece of image data, the invalid cache size being a size for storing a piece of image data that is not used in a record located between a record in which the piece of image data is used first and a record in which the piece of image data is used last; and
   a determining step of determining a process order for a record having a minimum invalid cache size with respect to a plurality of combinations of process order for the plurality of records.

3. A non-transitory storage medium storing a computer-readable program for processing variable print data including a plurality of records and layout data, each record indicating that a plurality of pieces of image data are used, the program causing a computer to execute: a specifying step of specifying the number of records in which a piece of image data selected from among the plurality of pieces of image data is not used, the records being located between a record in which the piece of image data is used first and a record in which the piece of image data is used last;

a deriving step of deriving an invalid cache size in accordance with the number of records specified in the specifying step and a data amount of the piece of image data, the invalid cache size being a size for storing a piece of image data that is not used in a record located between a record in which the piece of image data is used first and a record in which the piece of image data is used last; and a determining step of determining a process order for a record having a minimum invalid cache size with respect to a plurality of combinations of process order for the plurality of records.

* * * * *